(12) United States Patent
Akl et al.

(10) Patent No.: US 11,876,754 B2
(45) Date of Patent: Jan. 16, 2024

(54) SIGNALING OF INTENDED TIME DIVISION DUPLEXING DOWNLINK-UPLINK CONFIGURATION

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 17/447,517

(22) Filed: Sep. 13, 2021

(65) Prior Publication Data

US 2022/0085965 A1    Mar. 17, 2022

Related U.S. Application Data

(60) Provisional application No. 62/706,848, filed on Sep. 14, 2020.

(51) Int. Cl.
*H04W 48/16* (2009.01)
*H04L 5/14* (2006.01)
*H04W 48/18* (2009.01)

(52) U.S. Cl.
CPC .......... *H04L 5/1469* (2013.01); *H04L 5/1461* (2013.01); *H04W 48/16* (2013.01); *H04W 48/18* (2013.01)

(58) Field of Classification Search
CPC ... H04L 5/1469; H04L 5/1461; H04L 5/0053; H04L 5/0032; H04W 48/16; H04W 48/18; H04W 72/27
See application file for complete search history.

(56) References Cited

U.S. PATENT DOCUMENTS 11,533,779 B2 *   12/2022   Wang ..................... H04L 5/0055
2008/0080414 A1 *  4/2008   Thubert ................ H04W 76/12
                                                          370/328

(Continued)

FOREIGN PATENT DOCUMENTS

WO    WO-2019057279 A1 *   3/2019   ........ H04W 28/0983

OTHER PUBLICATIONS

International Search Report and Written Opinion—PCT/US2021/071442—ISA/EPO—dated Jan. 4, 2022.

(Continued)

*Primary Examiner* — Julio R Perez
(74) *Attorney, Agent, or Firm* — Arun Swain

(57) ABSTRACT

Various aspects of the present disclosure generally relate to wireless communication. In some aspects, a network node may generate an intended time division duplexing (TDD) downlink-uplink (DL-UL) configuration, wherein the network node is associated with a first central unit (CU) and a second CU, and wherein the intended TDD DL-UL configuration is for a cell that is served by the network node and associated with the second CU. The network node may transmit the intended TDD DL-UL configuration for the cell to the first CU. Numerous other aspects are described.

30 Claims, 8 Drawing Sheets

(56) References Cited

U.S. PATENT DOCUMENTS

| | | | | |
|---|---|---|---|---|
| 2010/0128630 | A1* | 5/2010 | Barak | H04W 92/20 370/254 |
| 2015/0173086 | A1* | 6/2015 | Karaman | H04W 84/22 370/254 |
| 2017/0034850 | A1* | 2/2017 | Rico Alvarino | H04L 43/16 |
| 2020/0145994 | A1* | 5/2020 | Luo | H04W 72/0446 |
| 2020/0260326 | A1* | 8/2020 | Hashemi | H04W 28/0983 |
| 2021/0105698 | A1* | 4/2021 | Jactat | H04W 28/0263 |
| 2021/0259006 | A1* | 8/2021 | Yoshioka | H04L 1/1861 |
| 2021/0314785 | A1* | 10/2021 | Raghavan | H04W 76/11 |
| 2022/0085965 | A1* | 3/2022 | Akl | H04L 5/0053 |
| 2022/0110140 | A1* | 4/2022 | Takeda | H04W 72/23 |
| 2022/0272699 | A1* | 8/2022 | Zhuo | H04W 72/27 |
| 2022/0345993 | A1* | 10/2022 | Reial | H04W 36/00835 |
| 2023/0051867 | A1* | 2/2023 | Lin | H04W 72/21 |

OTHER PUBLICATIONS

Samsung: "(TP for NR-IAB BL CR for 38.473) Remaining Issues Except Bearer Mapping Configuration", 3GPP TSG-RAN WG3 #107bis-e, 3GPP Draft, R3-202064, 3rd Generation Partnership Project (3gpp), Mobile Competence Centre 650, Route Des Lucioles F-06921 Sophia-Antipolis Cedex, France, vol. RAN WG3, No. Online, Apr. 20, 2020-Apr. 30, 2020, Apr. 10, 2020 (Apr. 10, 2020), pp. 1-40, XP051873981, Retrieved from the Internet: URL: https://ftp.3gpp.org/tsg_ran/WG3_Iu/TSGR3_107bis_e/Docs/R3-202064.zip, R3- 202064_BHRemainingIssue_v0.0.doc [retrieved on Apr. 10, 2020], Figure 1, Section: 2.1.

ZTE., et al., "Correction on CLI", 3GPP Draft, 3GPP TSG-RAN WG3 #108-e, RP-201085, 3rd Generation Partnership Project (3GPP), Mobile Competence Centre, 650, Route Des Lucioles, F-06921 Sophia-Antipolis Cedex, France, vol. RAN WG3, No. Online, Jun. 1, 2020-Jun. 11, 2020, Jun. 24, 2020 (Jun. 24, 2020), 4 Pages, XP051905751, Retrieved from the Internet: URL: https://ftp.3gpp.org/tsg_ran/TSG_RAN/TSGR_88e/Docs/RP-201085.zip38473_CR0561r1_(Rel-16)_R3-203861.doc [retrieved on Jun. 24, 2020] Section 8.2.3.2, p. 2 section 8.2.4.2, p. 3-p. 4.

ZTE: "Summary of Offline Discussion on TDD Pattern Exchange for NR-DC Power Control", 3GPP TSG-RAN WG3 #107bis-e, 3GPP Draft, R3-202554, 3rd Generation Partnership Project (3GPP), Mobile Competence Centre, 650, Route Des Lucioles, F-06921 Sophia-Antipolis Cedex, France, vol. RAN WG3, No. Online, Apr. 20, 2020-Apr. 30, 2020, May 4, 2020 (May 4, 2020), 8 Pages, XP051880759, Retrieved from the Internet: URL: https://ftp.3gpp.org/tsg_ran/WG3_Iu/TSGR3_107bis_e/Docs/R3-202554.zip, R3-202554 Summary CB # 88_TDD_pattern_NR-DC_pwr_ctrl-final.doc [retrieved on May 4, 2020], section 3.3, p. 5-p. 6.

* cited by examiner

SIGNALING OF INTENDED TIME DIVISION DUPLEXING DOWNLINK-UPLINK CONFIGURATION

CROSS-REFERENCE TO RELATED APPLICATION

This Patent Applications claims priority to U.S. Provisional Patent Application No. 62/706,848, filed on Sep. 14, 2020, entitled "INTERFERENCE MANAGEMENT AND POWER COORDINATION IN RADIO ACCESS NETWORK SHARING SCENARIOS," and assigned to the assignee hereof. The disclosure of the prior Application is considered part of and is incorporated by reference into this Patent Application

FIELD OF THE DISCLOSURE

Aspects of the present disclosure generally relate to wireless communication and to techniques and apparatuses for interference management and power coordination in radio access network (RAN) sharing scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a network node includes generating an intended time division duplexing (TDD) downlink-uplink (DL-UL) configuration, wherein the network node is associated with a first central unit (CU) and a second CU, and wherein the intended TDD DL-UL configuration is for a cell that is served by the network node and associated with the second CU; and transmitting the intended TDD DL-UL configuration for the cell to the first CU.

In some aspects, a method of wireless communication performed by a first CU includes receiving, from a network node, an intended TDD DL-UL configuration, wherein the network node is associated with the first CU and a second CU, and wherein the intended TDD DL-UL configuration is for a cell that is served by the network node and associated with the second CU; and communicating based at least in part on the intended TDD DL-UL configuration for the cell.

In some aspects, a network node for wireless communication includes a memory and one or more processors coupled to the memory, the one or more processors configured to: generate an intended TDD DL-UL configuration, wherein the network node is associated with a first CU and a second CU, and wherein the intended TDD DL-UL configuration is for a cell that is served by the network node and associated with the second CU; and transmit the intended TDD DL-UL configuration for the cell to the first CU.

In some aspects, a first CU for wireless communication includes a memory and one or more processors coupled to the memory, the one or more processors configured to: receive, from a network node, an intended TDD DL-UL configuration, wherein the network node is associated with the first CU and a second CU, and wherein the intended TDD DL-UL configuration is for a cell that is served by the network node and associated with the second CU; and communicate based at least in part on the intended TDD DL-UL configuration for the cell.

In some aspects, a non-transitory computer-readable medium storing a set of instructions for wireless communication includes one or more instructions that, when executed by one or more processors of a network node, cause the network node to: generate an intended TDD DL-UL configuration, wherein the network node is associated with a first CU and a second CU, and wherein the intended TDD DL-UL configuration is for a cell that is served by the network node and associated with the second CU; and transmit the intended TDD DL-UL configuration for the cell to the first CU.

In some aspects, a non-transitory computer-readable medium storing a set of instructions for wireless communication includes one or more instructions that, when executed by one or more processors of a first CU, cause the first CU to: receive, from a network node, an intended TDD DL-UL configuration, wherein the network node is associated with the first CU and a second CU, and wherein the intended TDD DL-UL configuration is for a cell that is served by the network node and associated with the second CU; and communicate based at least in part on the intended TDD DL-UL configuration for the cell.

In some aspects, an apparatus for wireless communication includes means for generating an intended TDD DL-UL configuration, wherein the apparatus is associated with a first CU and a second CU, and wherein the intended TDD DL-UL configuration is for a cell that is served by the apparatus and associated with the second CU; and means for transmitting the intended TDD DL-UL configuration for the cell to the first CU.

In some aspects, an apparatus for wireless communication includes means for receiving, from a network node, an intended TDD DL-UL configuration, wherein the network node is associated with the apparatus and a second CU, and wherein the intended TDD DL-UL configuration is for a cell that is served by the network node and associated with the second CU; and means for communicating based at least in part on the intended TDD DL-UL configuration for the cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
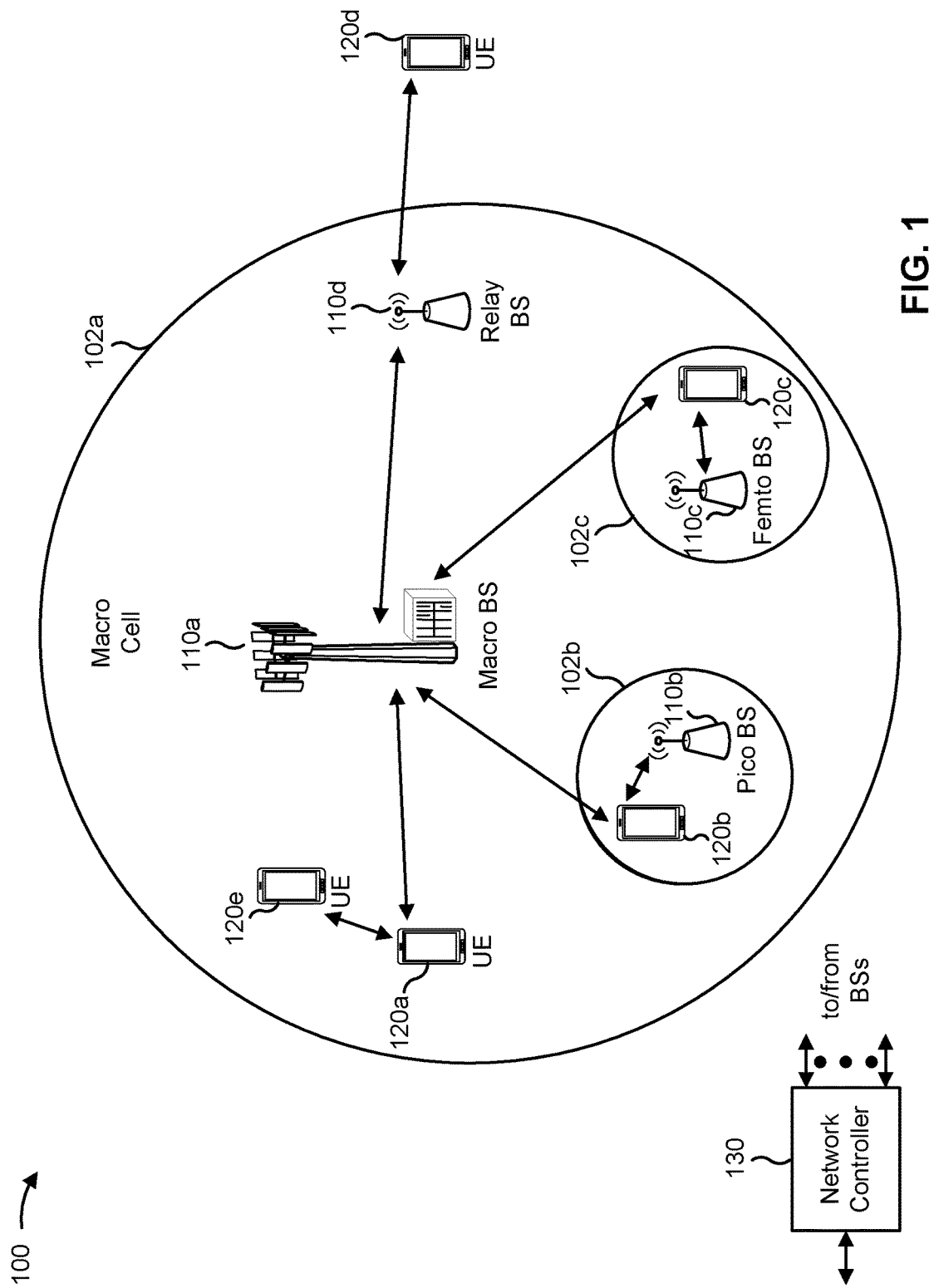
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
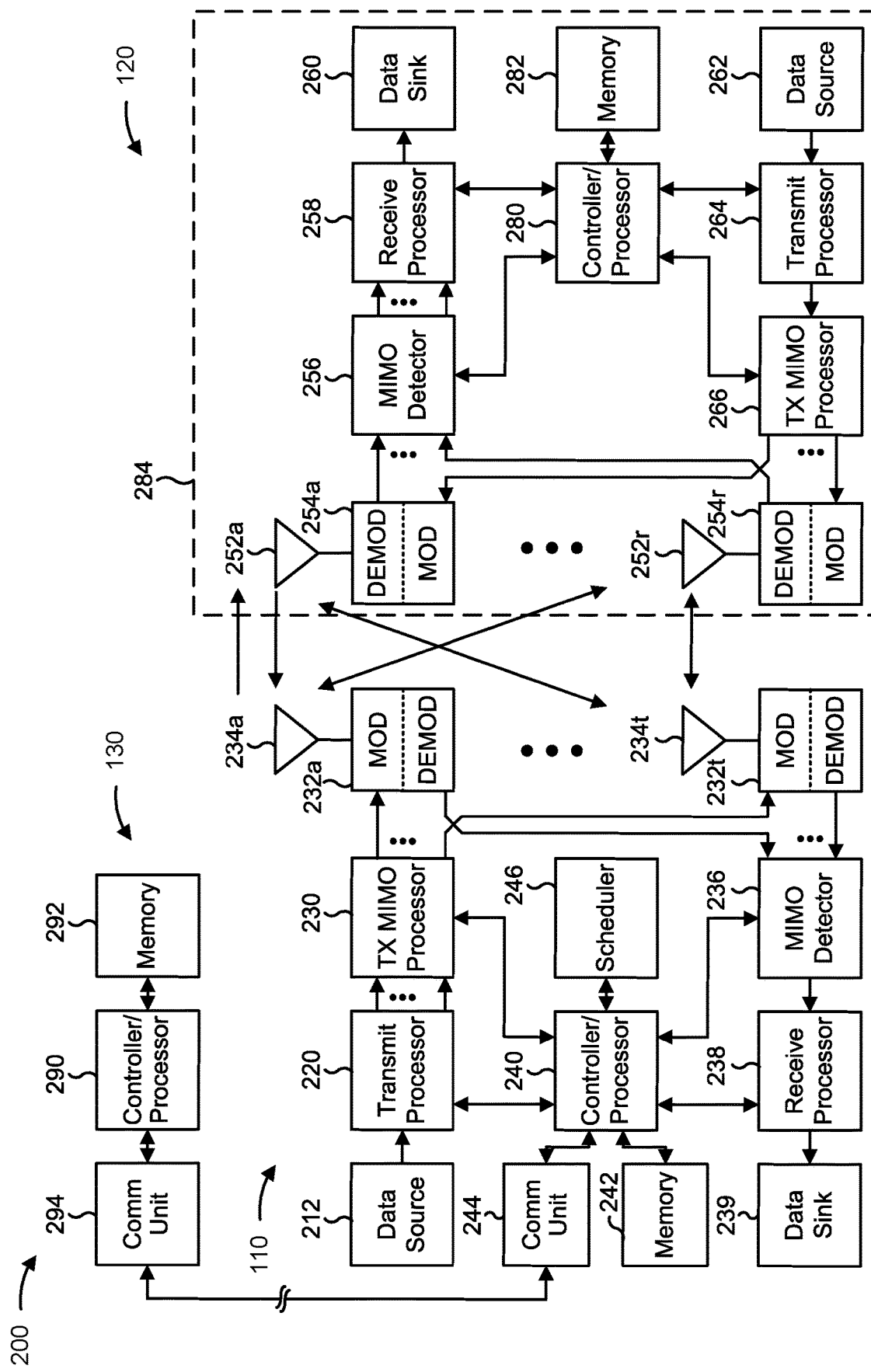
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with intended time division duplexing (TDD) downlink-uplink (DL-UL) configuration signaling for a RAN sharing deployment, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the network node includes means for generating an intended TDD DL-UL configuration, wherein the network node is associated with a first central unit (CU) and a second CU, and wherein the intended TDD DL-UL configuration is for a cell that is served by the network node and associated with the second CU; and/or means for transmitting the intended TDD DL-UL configuration for the cell to the first CU. The means for the network node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the network node includes means for transmitting, to the first CU, information indicating a second intended TDD DL-UL configuration for the second cell. In some aspects, the network node includes means for receiving, from the first CU, a request for the intended TDD DL-UL configuration, wherein transmitting the intended TDD DL-UL configuration is based at least in part on the request.

In some aspects, the first CU includes means for receiving, from a network node, an intended TDD DL-UL configuration, wherein the network node is associated with the first CU and a second CU, and wherein the intended TDD DL-UL configuration is for a cell that is served by the network node and associated with the second CU; and/or means for communicating based at least in part on the intended TDD DL-UL configuration for the cell. The means for the first CU to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the first CU includes means for receiving, from the network node, information indicating a second intended TDD DL-UL configuration for the second cell. In some aspects, the first CU includes means for transmitting, to the network node, a request for the intended TDD DL-UL configuration, wherein receiving the intended TDD DL-UL configuration is based at least in part on the request. In some aspects, the first CU includes means for performing cross-link interference mitigation based at least in part on the intended TDD DL-UL configuration. In some aspects, the first CU includes means for performing power coordination for dual connectivity based at least in part on the intended TDD DL-UL configuration. In some aspects, the first CU includes means for forwarding the intended TDD DL-UL configuration to a second distributed unit (DU) associated with the first CU. In some aspects, the first CU includes means for receiving a second intended TDD DL-UL configuration. In some aspects, the first CU includes means for merging the first intended TDD DL-UL configuration and the second intended TDD DL-UL configuration. In some aspects, the first CU includes means for forwarding a merged intended TDD DL-UL configuration to a DU associated with the first CU. In some aspects, the first CU includes means for transmitting the intended TDD DL-UL configuration to a third CU or a gNB.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
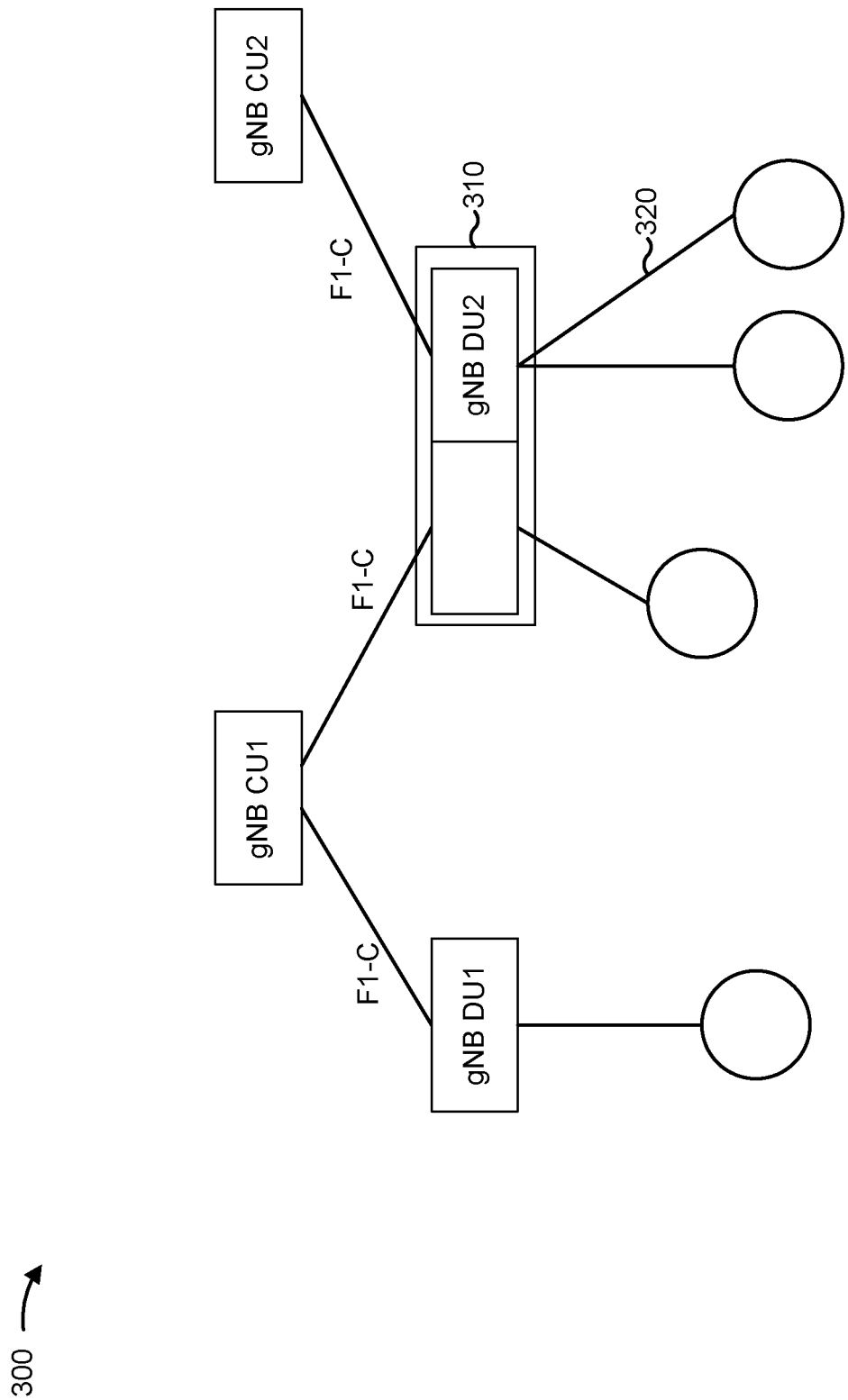
FIG. 3 is a diagram illustrating an example of radio access network (RAN) sharing, in accordance with the present disclosure.

FIG. 3 is a diagram illustrating an example 300 of RAN sharing, in accordance with the present disclosure. As shown, example 300 includes a gNB central unit 1 (CU1) and a gNB central unit 2 (CU2). Furthermore, example 300 includes a number of gNB DUs. A gNB may include a CU and one or more DUs. A CU may communicate with a DU via an F1 interface, such as an F1 control (F1-C) interface or an F1 application protocol (F1-AP) interface. A DU may be associated with a gNB or may be associated with a network node, such as an integrated access and backhaul (IAB) node.

Generally, a gNB CU may handle packet data convergence protocol (PDCP) layer functions, whereas a gNB DU may handle radio link control (RLC), medium access control (MAC), and physical (PHY) layer functions. For example, the CU may handle network configuration and management tasks, whereas the DU may handle Layer 1 or Layer 2 communication tasks, such as relaying, scheduling, and so on. Thus, the CU/DU architecture may aid in virtualizing network functionality in the CU, while facilitating lower-layer functions (e.g., RLC/MAC/PHY) that may be difficult to virtualize.

In some cases, multiple CUs may be associated with an interface between each other. For example, a first CU and a second CU may have an Xn interface based at least in part on the first CU and the second CU being associated with the same public land mobile network (PLMN) or the same non-public network (NPN). Thus, information can be exchanged between the first CU and the second CU. In some aspects, two CUs may be associated with different networks (e.g., different PLMNs or different NPNs). If the two CUs are associated with different networks, then the two CUs may not be associated with a direct interface between each other.

A DU may handle scheduling for one or more child nodes, such as a UE, a network node, and/or the like. Child nodes are represented in FIG. 3 by circles. A child node may connect to a cell served by a DU. For example, the gNB DU1 is associated with a single child node, which may be connected to a cell served by the gNB DU1.

In some cases, a network node may provide multiple DUs. For example, the network node shown by reference number 310 may provide a first DU associated with the gNB CU1 and a second DU (e.g., the gNB DU2) associated with the gNB CU2. In this case, the first DU may be associated with the CU1 based at least in part on a cell provided by the first DU being associated with the CU1, and the second DU may be associated with the gNB CU2 based at least in part on a cell provided by the second DU being associated with the CU2. The first DU and the second DU may be capable of exchanging information with each other. Thus, the first DU and the second DU may effectively have F1-C or radio resource control (RRC) interfaces with both the gNB CU1 and the gNB CU2, even if the gNB CU1 and the gNB CU2 do not have an interface between each other.

A cell may have a cell global identifier (CGI), such as an NR CGI (NCGI). The NCGI uniquely identifies a cell. The NCGI includes a PLMN identifier and an NR cell identifier. The PLMN identifier (which may include 24 bits) may include an MCC (e.g., 12 bits) and an MNC (e.g., 12 bits). The NCI (e.g., 36 bits in 5G) may include a gNB identifier (e.g., a leftmost 22 to 32 bits) and a local cell identifier (e.g., the remaining bits of the NCI). The gNB may be unique within a gNB, and may be common for all cells (e.g., all IAB-donor DUs and all IAB-node DUs) served by the gNB with one IAB-donor CU. Equivalently, the PLMN and gNB ID may globally identify a gNB.

A cell may be a TDD cell. For a TDD cell, time resources (e.g., slots or symbols) may be designated for uplink communications only, downlink communications only, or either of uplink communications and downlink communications (referred to as a flexible resource). The designation of time resources as UL-only, DL-only, or flexible may be specified by a TDD DL-UL slot configuration. The configuration may indicate a periodicity and a list of slot indexes based at least in part on the periodicity. The configuration may also indicate which symbols of slots identified by the list of slot indexes are uplink-only, downlink-only, or flexible.

A cell may be associated with an intended TDD DL-UL configuration. The intended TDD DL-UL configuration may indicate a subcarrier spacing, a cyclic prefix, and a TDD DL-UL slot configuration of the cell. A DU or a CU may determine the intended TDD DL-UL configuration, and may provide the intended TDD DL-UL configuration to another node (e.g., another next generation radio access network (NG-RAN) node such as another CU or a DU). A receiving NG-RAN node (e.g., a neighboring NG-RAN node) may take into account, for cross link interference mitigation and/or New Radio Dual Connectivity (NR-DC) power coordination, the intended TDD DL-UL configuration when operating cells of the receiving NG-RAN node.

If an intended TDD DL-UL configuration information element is included in an Xn application protocol (Xn-AP) message, the receiving NG-RAN node may take the information element into account for cross-link interference management and/or NR-DC power coordination with the transmitting NG-RAN node. If the intended TDD DL-UL configuration information element is present in an F1-AP message to the gNB-CU, the receiving gNB-CU may use the intended TDD DL-UL configuration for cross-link interference management and/or NR-DC power coordination. In some cases, the gNB CU may merge intended TDD DL-UL configuration information received from two or more DUs. If a Neighbor Cell Information List information element is present in an F1-AP message to a gNB-DU, the receiving gNB-DU may use the received information for cross-link interference management and/or NR-DC power coordination. Therefore, the intended TDD DL-UL configuration may be useful for cross link interference mitigation and/or NR-DC power coordination, particularly in systems with multiple CUs and or multiple DUs.

If there is an Xn interface between the gNB CU1 and the gNB CU2, then the gNB CU2 can transmit information indicating an intended TDD DL-UL configuration for a cell served by the gNB CU2 to the gNB CU1. The gNB CU1 may then forward the intended TDD DL-UL configuration to the gNB DU1 for cross link interference management or NR-DC power coordination. However, in some circumstances, an Xn interface may not exist between the gNB CU1 and the gNB CU2. For example, if the gNB CU1 is associated with a first network and the gNB CU2 is associated with a second network, then no direct interface may exist between the gNB CU1 and the gNB CU2, meaning that intended TDD DL-UL configurations cannot be communicated between the gNB CU1 and the gNB CU2. If intended TDD DL-UL configurations cannot be communicated between the gNB CU1 and the gNB CU2 (and thus between DUs associated with the gNB CU1 or the gNB CU2), then the DUs may not be able to take into account the intended TDD DL-UL configuration when performing cross link interference mitigation or NR-DC power coordination, which increases cross-link interference and degrades power coordination for network nodes and/or UEs.

Some techniques and apparatuses described herein enable a DU such as the gNB DU2 (or a network node implementing a DU, such as the network node shown by reference number 310) with signaling connections to a first CU and a second CU to provide, to the first CU, an intended TDD DL-UL configuration for a cell associated with the second CU. For example, the network node shown by reference number 310 may provide the intended TDD DL-UL configuration for a cell 320 associated with the gNB CU2 from the gNB CU2 to the gNB CU1 via respective F1-C or RRC connections with the gNB CU1 and the gNB CU2. In some aspects, the cell may be served by the DU, and may be associated with an NCI associated with the second CU. As another example, the cell may be associated with an NCI associated with the first CU, where the cell is deactivated by the first CU or access is barred for child nodes that select a network associated with the first CU. The first CU may take the intended TDD DL-UL configuration into account for cross link interference mitigation, NR-DC power coordination, or other operations. Additionally, or alternatively, the first CU may forward the intended TDD DL-UL configuration to one or more DUs associated with the first CU, and the one or more DUs may perform cross link interference mitigation, NR-DC power coordination, or other operations. Thus, interference is reduced, NR-DC power coordination is improved, and coexistence of different networks (e.g., different PLMNs or different NPNs) is improved.

As indicated above, FIG. 3 is provided as an example. Other examples may differ from what is described with regard to FIG. 3.

Figure 4:
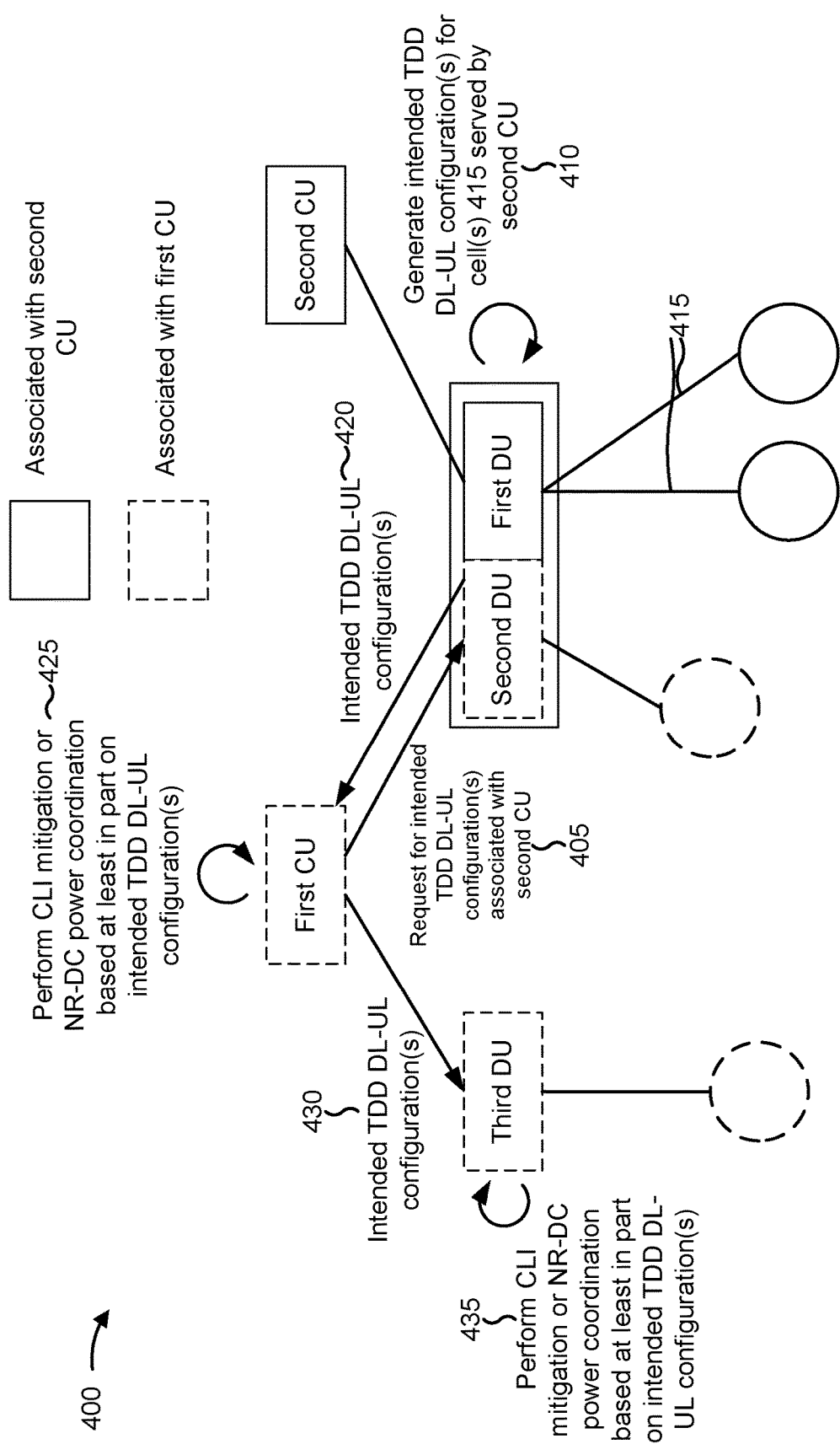
FIG. 4 is a diagram illustrating an example of relaying an intended time division duplexing (TDD) downlink-uplink (DL-UL) configuration associated with a cell served by a second central unit (CU) to a first CU, in accordance with the present disclosure.

FIG. 4 is a diagram illustrating an example 400 of relaying an intended TDD DL-UL configuration associated with a cell served by a second CU to a first CU, in accordance with the present disclosure. As shown, example 400 includes a first CU (e.g., a gNB CU, such as gNB CU1 depicted in FIG. 3), a second CU (e.g., a gNB CU, such as gNB CU2 depicted in FIG. 3), and a DU (e.g., a gNB DU, such as the gNB DU2 depicted in FIG. 3). In some aspects, one or more operations described as performed by the DU may be performed by a network node that implements the DU or by another DU implemented by the network node that implements the DU. Additionally, or alternatively, communication operations of the DU, such as transmission and reception, may be performed by a mobile termination (MT) associated with the DU.

Network nodes (e.g., DUs, MTs, UEs, or the like) associated with the first CU are indicated in FIG. 4 by a dashed outline. For example, a DU associated with the first CU may provide a cell associated with an NCI that identifies the first CU. Network nodes associated with the second CU are indicated by a solid outline. Here, the first DU is associated with the second CU, and the second DU and the third DU are associated with the first CU. Furthermore, the first DU and the second DU are implemented at a single network node. For example, the first DU and the second DU may be logical DUs implemented by the network node. The first DU may be associated with a signaling connection with the second CU (e.g., via an F1 interface, an RRC interface, or a similar interface). The second DU and the third DU may be associated with a signaling connection with the first CU (e.g., via an F1 interface, an RRC interface, or a similar interface). Thus, the network device that implements the first DU and the second DU can communicate with the first CU and the second CU.

As shown by reference number 405, the first CU may transmit, to the first DU via the second DU, a request for one or more intended TDD DL-UL configurations associated with the second CU. For example, the first CU may transmit the request shown by reference number 405 via the signaling connection between the first CU and the second DU. The second DU may provide the request shown by reference number 405 to the first DU via a signaling interface between the second DU and the first DU. In some aspects, the first CU may request one or more intended TDD DL-UL configurations for cells 415 served by the first DU and associated with the second CU. For example, the first CU may request a merged intended TDD DL-UL configuration, or may request separate intended TDD DL-UL configurations for the cells 415 served by the first DU and associated with the second CU. A merged intended TDD DL-UL configuration is an information element that indicates an intended TDD DL-UL configuration for multiple, different cells. In some aspects, the first DU may receive an activation of a cell served by the first DU. For example, the first DU may receive an activation of a cell 415 from the second CU.

As shown by reference number 410, the first DU may generate the one or more intended TDD DL-UL configurations for the cells 415 served by the second CU. For example, the first DU may generate the one or more intended TDD DL-UL configurations based at least in part on respective TDD DL-UL slot configurations of the one or more cells 415. In some aspects, the first DU may receive, from the second CU, information indicating the one or more intended TDD DL-UL configurations. In some aspects, the first DU may determine the one or more intended TDD DL-UL configurations. For example, the first DU may determine the one or more intended TDD DL-UL configurations based at least in part on serving the one or more cells 415.

As shown by reference number 420, the first DU may provide, to the first CU via the second DU, information indicating the one or more intended TDD DL-UL configurations associated with the one or more cells 415. For example, the first DU may provide the information indicating the one or more intended TDD DL-UL configurations via the signaling connection between the first CU and the second DU. In some aspects, the first DU may provide information indicating an intended TDD DL-UL configuration for a cell based at least in part on the first CU requesting an intended TDD DL-UL configuration for the cell. In some aspects, the first DU may provide information indicating one or more intended TDD DL-UL configurations for each cell served by the first DU and associated with the second CU.

In some aspects, the cell for which the intended TDD DL-UL configuration is provided may have an NCI that carries an identifier of the second CU (e.g., a second gNB associated with the second CU). In some aspects, the cell for which the intended TDD DL-UL configuration is provided may have an NCI that carries an identifier of the first CU (e.g., a first gNB associated with the first CU), where the cell is deactivated by the first CU, or access is barred for child nodes that select a PLMN associated with the first CU.

An intended TDD DL-UL configuration may include, for example, information indicating a transmission periodicity associated with a corresponding cell, information indicating a set of slots (e.g., information indicating corresponding indices of the set of slots), a slot format for the set of slots (e.g., a slot format indicating uplink symbols, downlink symbols, or flexible symbols), and/or the like. In some aspects, the intended TDD DL-UL configuration may include at least part of the information included in an intended TDD DL-UL configuration as described in connection with FIG. 3, above.

In some aspects, as shown in example 300, the first DU may serve multiple cells. In this case, the first DU may provide intended TDD DL-UL configurations for the multiple cells. For example, the first DU may transmit separate intended TDD DL-UL configurations for each cell served by the first DU. As another example, the first DU may transmit a merged intended TDD DL-UL configuration for the first cell and the second cell, as described elsewhere. In some aspects, the different cells for which the first DU provides intended TDD DL-UL configurations may be associated with the first CU, the second CU, or a third CU. For example, the first DU may provide an intended TDD DL-UL configuration for a first cell associated with the second CU and for a second cell associated with one of the first CU, the second CU, or the third CU. Thus, the first DU may provide intended TDD DL-UL configurations for cells associated with the same CUs or different CUs.

As shown by reference number 425, the first CU may perform one or more actions based at least in part on the one or more intended TDD DL-UL configurations received from the first DU. As one example, the first CU may perform or configure cross link interference (CLI) mitigation based at least in part on the one or more intended TDD DL-UL configurations. As another example, the first CU may perform NR-DC power coordination based at least in part on the one or more intended TDD DL-UL configurations.

In some aspects, as shown by reference number 430, the first CU may provide at least part of the one or more intended TDD DL-UL configurations to the third DU. For example, the first CU may forward at least part of the one or more intended TDD DL-UL configurations to one or more DUs associated with the first CU. As shown by reference number 435, the third DU (e.g., a DU associated with the first CU) may perform an action based at least part on the one or more intended TDD DL-UL configurations. For example, the third DU may perform cross link interference mitigation, NR-DC power coordination, and or the like.

In some aspects, the first CU may receive multiple intended TDD DL-UL configurations. For example, the first CU may receive the multiple intended TDD DL-UL configurations from the same DU, from different DUs, or from another CU (e.g., the second CU or a different CU). In some aspects, the first CU may merge the multiple intended TDD DL-UL configurations to form a merged intended TDD DL-UL configuration. In some aspects, the first CU may forward the merged intended TDD DL-UL configuration to a DU that has a signaling connection with the first CU. For example, the first CU may forward the merged intended TDD DL-UL configuration to a DU associated with the first CU. In some aspects, the first CU may transmit the intended TDD DL-UL configuration received from the first DU to another gNB (e.g., a CU associated with the other gNB). Additionally, or alternatively, the first CU may transmit a merged intended TDD DL-UL configuration that incorporates the received intended TDD DL-UL configuration to the other gNB (e.g., the CU associated with the other gNB).

By transmitting the one or more intended TDD DL-UL configurations to the first CU, the first DU facilitates cross-link interference mitigation and NR-DC power coordination by the first CU and/or DUs served by the first CU. Thus, the first DU reduces cross-link interference, improves UE power utilization, and improves coexistence of CUs, such as CUs associated with different networks.

As indicated above, FIG. 4 is provided as an example. Other examples may differ from what is described with regard to FIG. 4.

Figure 5:
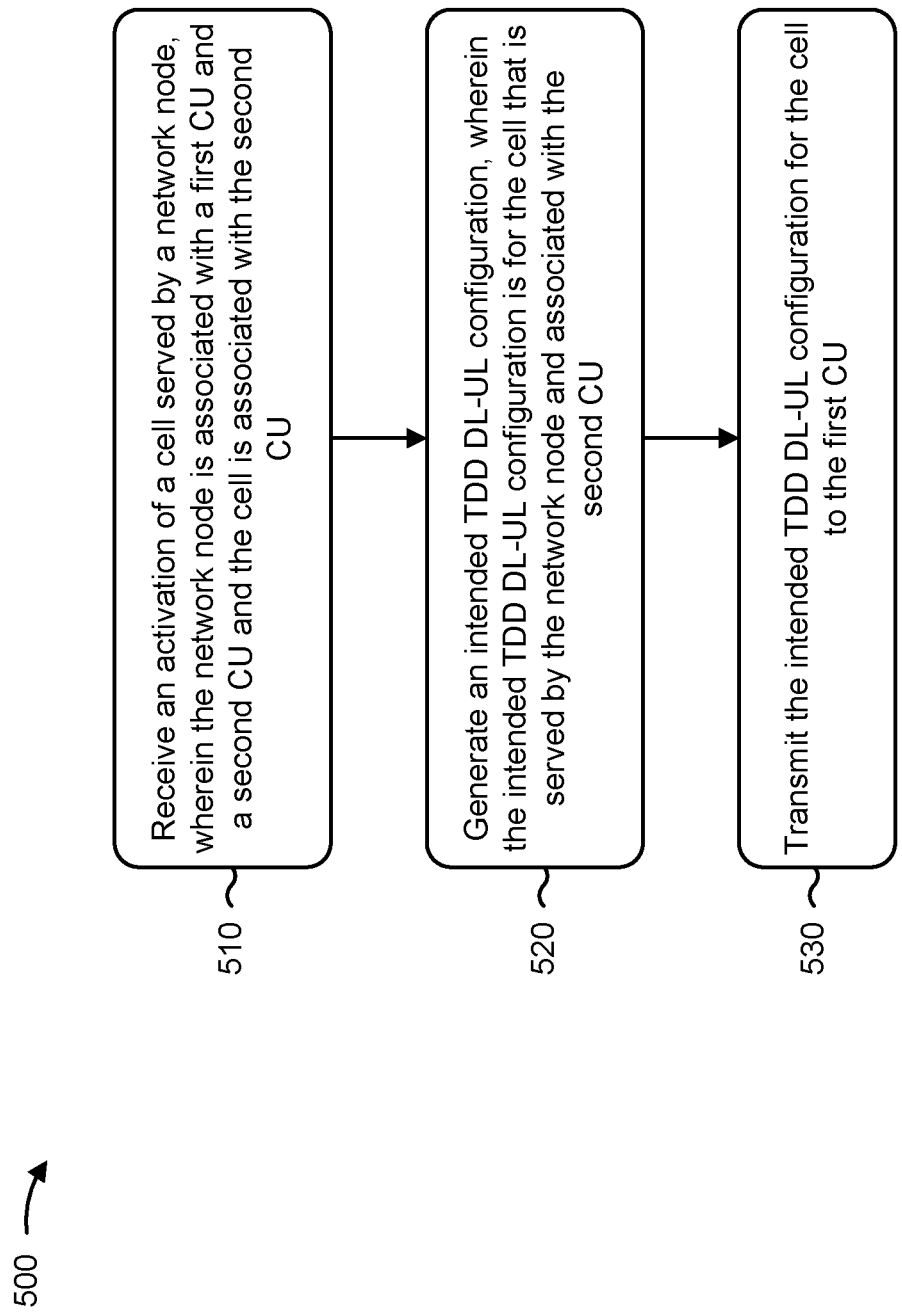
FIGS. 5-6 are diagrams illustrating example processes associated with intended TDD DL-UL configuration signaling in a RAN sharing deployment, in accordance with the present disclosure.

FIG. 5 is a diagram illustrating an example process 500 performed, for example, by a network node, in accordance with the present disclosure. Example process 500 is an example where the network node (e.g., the gNB DU2 of FIG. 3, the first DU of FIG. 4, a network node implementing a DU, BS 110, and/or the like) performs operations associated with interference management and power coordination in RAN sharing scenarios.

As shown in FIG. 5, in some aspects, process 500 may include receiving an activation of a cell that is served by the network node, wherein the network node is associated with a first CU and a second CU and the cell is associated with the second CU (block 520). For example, the network node (e.g., using reception component 702, depicted in FIG. 7) may receive an activation of a cell that is served by the network node, wherein the network node is associated with a first CU and a second CU and the cell is associated with the second CU, as described above.

As shown in FIG. 5, in some aspects, process 500 may include generating an intended TDD DL-UL configuration, wherein the intended TDD DL-UL configuration is for the cell that is served by the network node and associated with the second CU (block 520). For example, the network node (e.g., using generation component 708, depicted in FIG. 7) may generate an intended TDD DL-UL configuration, wherein the network node is associated with a first CU and a second CU, and wherein the intended TDD DL-UL configuration is for a cell that is served by the network node and associated with the second CU, as described above.

As further shown in FIG. 5, in some aspects, process 500 may include transmitting the intended TDD DL-UL configuration for the cell to the first CU (block 530). For example, the network node (e.g., using transmission component 704, depicted in FIG. 7) may transmit the intended TDD DL-UL configuration for the cell to the first CU, as described above.

Process 500 may include additional aspects, such as any single aspect or any combination of aspects described below and/or in connection with one or more other processes described elsewhere herein.

In a first aspect, the intended TDD DL-UL configuration is transmitted to the first CU on a signaling connection associated with an F1 control protocol.

In a second aspect, alone or in combination with the first aspect, the network node and the second CU are associated with a signaling connection associated with an F1 control protocol.

In a third aspect, alone or in combination with one or more of the first and second aspects, the network node comprises a first DU associated with the first CU and a second DU associated with the second CU.

In a fourth aspect, alone or in combination with one or more of the first through third aspects, the first CU and the second CU are associated with a same network.

In a fifth aspect, alone or in combination with one or more of the first through fourth aspects, the first CU and the second CU are associated with different networks.

In a sixth aspect, alone or in combination with one or more of the first through fifth aspects, the cell is associated with a cell identifier (e.g., an NCI) that identifies the second CU.

In a seventh aspect, alone or in combination with one or more of the first through sixth aspects, the cell is associated with a cell identifier (e.g., an NCI) that identifies the first CU, and the cell is deactivated by the first CU or is barred for access by child nodes that select a network associated with the first CU.

In an eighth aspect, alone or in combination with one or more of the first through seventh aspects, the intended TDD DL-UL configuration indicates a transmission periodicity for the cell.

In a ninth aspect, alone or in combination with one or more of the first through eighth aspects, the intended TDD DL-UL configuration indicates a set of slots with corresponding indices and slot formats for the set of slots.

In a tenth aspect, alone or in combination with one or more of the first through ninth aspects, the cell is a first cell, and the network node serves a second cell.

In an eleventh aspect, alone or in combination with one or more of the first through tenth aspects, the intended TDD DL-UL configuration is a first intended TDD DL-UL configuration, and process 500 further comprises transmitting, to the first CU, information indicating a second intended TDD DL-UL configuration for the second cell.

In a twelfth aspect, alone or in combination with one or more of the first through eleventh aspects, the intended TDD DL-UL configuration is for the first cell and the second cell.

In a thirteenth aspect, alone or in combination with one or more of the first through twelfth aspects, the second cell is associated with the first CU.

In a fourteenth aspect, alone or in combination with one or more of the first through thirteenth aspects, the second cell is associated with the second CU.

In a fifteenth aspect, alone or in combination with one or more of the first through fourteenth aspects, the second cell is associated with a third CU.

In a sixteenth aspect, alone or in combination with one or more of the first through fifteenth aspects, process 500 includes receiving, from the first CU, a request for the intended TDD DL-UL configuration, wherein transmitting the intended TDD DL-UL configuration is based at least in part on the request.

In a seventeenth aspect, alone or in combination with one or more of the first through sixteenth aspects, the request is for a merged intended TDD DL-UL configuration for cells served by the network node and associated with the second CU.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
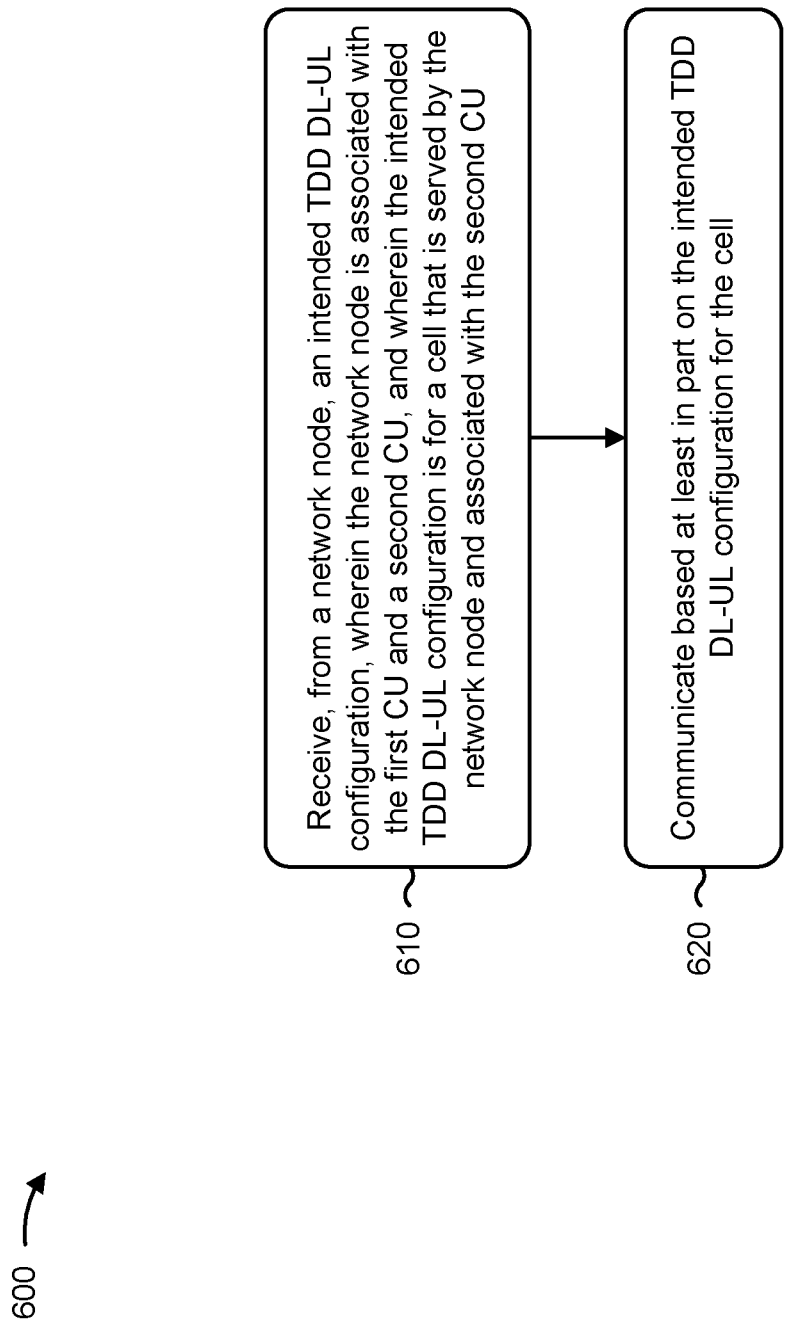

FIG. 6 is a diagram illustrating an example process 600 performed, for example, by a first CU, in accordance with the present disclosure. Example process 600 is an example where the first CU (e.g., BS 110, a gNB-CU such as gNB CU2 of FIG. 3, the first CU of FIG. 4) performs operations associated with interference management and power coordination in RAN sharing scenarios.

As shown in FIG. 6, in some aspects, process 600 may include receiving, from a network node, an intended TDD DL-UL configuration, wherein the network node is associated with the first CU and a second CU, and wherein the intended TDD DL-UL configuration is for a cell that is served by the network node and associated with the second CU (block 610). For example, the CU (e.g., using reception component 802, depicted in FIG. 8) may receive, from a network node, an intended TDD DL-UL configuration, wherein the network node is associated with the first CU and a second CU, and wherein the intended TDD DL-UL configuration is for a cell that is served by the network node and associated with the second CU, as described above.

As further shown in FIG. 6, in some aspects, process 600 may include communicating based at least in part on the intended TDD DL-UL configuration for the cell (block 620). For example, the CU (e.g., using reception component 802 or transmission component 804, depicted in FIG. 8) may communicate based at least in part on the intended TDD DL-UL configuration for the cell, as described above.

Process 600 may include additional aspects, such as any single aspect or any combination of aspects described below and/or in connection with one or more other processes described elsewhere herein.

In a first aspect, the intended TDD DL-UL configuration is received on a signaling connection associated with an F1 control protocol.

In a second aspect, alone or in combination with the first aspect, the network node comprises a first DU associated with the first CU and a second DU associated with the second CU.

In a third aspect, alone or in combination with one or more of the first and second aspects, the first CU and the second CU are associated with a same network.

In a fourth aspect, alone or in combination with one or more of the first through third aspects, the first CU and the second CU are associated with different networks.

In a fifth aspect, alone or in combination with one or more of the first through fourth aspects, the cell is associated with a cell identifier (e.g., an NCI) that identifies the second CU.

In a sixth aspect, alone or in combination with one or more of the first through fifth aspects, the cell is associated with a cell identifier (e.g., an NCI) that identifies the first CU, and wherein the cell is deactivated by the first CU or is barred for access by child nodes that select a network associated with the first CU.

In a seventh aspect, alone or in combination with one or more of the first through sixth aspects, the intended TDD DL-UL configuration indicates a transmission periodicity for the cell.

In an eighth aspect, alone or in combination with one or more of the first through seventh aspects, the intended TDD DL-UL configuration indicates a set of slots with corresponding indices and slot formats for the set of slots.

In a ninth aspect, alone or in combination with one or more of the first through eighth aspects, the cell is a first cell, and wherein the network node serves a second cell.

In a tenth aspect, alone or in combination with one or more of the first through ninth aspects, the intended TDD DL-UL configuration is a first intended TDD DL-UL configuration, and the process 600 further comprises receiving, from the network node, information indicating a second intended TDD DL-UL configuration for the second cell.

In an eleventh aspect, alone or in combination with one or more of the first through tenth aspects, the intended TDD DL-UL configuration is for the first cell and the second cell.

In a twelfth aspect, alone or in combination with one or more of the first through eleventh aspects, the second cell is associated with the first CU.

In a thirteenth aspect, alone or in combination with one or more of the first through twelfth aspects, the second cell is associated with the second CU.

In a fourteenth aspect, alone or in combination with one or more of the first through thirteenth aspects, the second cell is associated with a third CU.

In a fifteenth aspect, alone or in combination with one or more of the first through fourteenth aspects, process 600 includes transmitting, to the network node, a request for the intended TDD DL-UL configuration, wherein receiving the intended TDD DL-UL configuration is based at least in part on the request.

In a sixteenth aspect, alone or in combination with one or more of the first through fifteenth aspects, the request is for a merged intended TDD DL-UL configuration for cells served by the network node and associated with the second CU.

In a seventeenth aspect, alone or in combination with one or more of the first through sixteenth aspects, communicating based at least in part on the intended TDD DL-UL configuration further comprises performing cross-link interference mitigation based at least in part on the intended TDD DL-UL configuration.

In an eighteenth aspect, alone or in combination with one or more of the first through seventeenth aspects, communicating based at least in part on the intended TDD DL-UL configuration further comprises performing power coordination for dual connectivity based at least in part on the intended TDD DL-UL configuration.

In a nineteenth aspect, alone or in combination with one or more of the first through eighteenth aspects, the network node is a first DU, and communicating based at least in part on the intended TDD DL-UL configuration further comprises forwarding the intended TDD DL-UL configuration to a second DU associated with the first CU.

In a twentieth aspect, alone or in combination with one or more of the first through nineteenth aspects, the intended TDD DL-UL configuration is a first intended TDD DL-UL configuration, and process 600 further comprises receiving a second intended TDD DL-UL configuration.

In a twenty-first aspect, alone or in combination with one or more of the first through twentieth aspects, process 600 includes merging the first intended TDD DL-UL configuration and the second intended TDD DL-UL configuration.

In a twenty-second aspect, alone or in combination with one or more of the first through twenty-first aspects, process 600 includes forwarding a merged intended TDD DL-UL configuration to a DU associated with the first CU.

In a twenty-third aspect, alone or in combination with one or more of the first through twenty-second aspects, process 600 includes transmitting the intended TDD DL-UL configuration to a third CU or a gNB.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
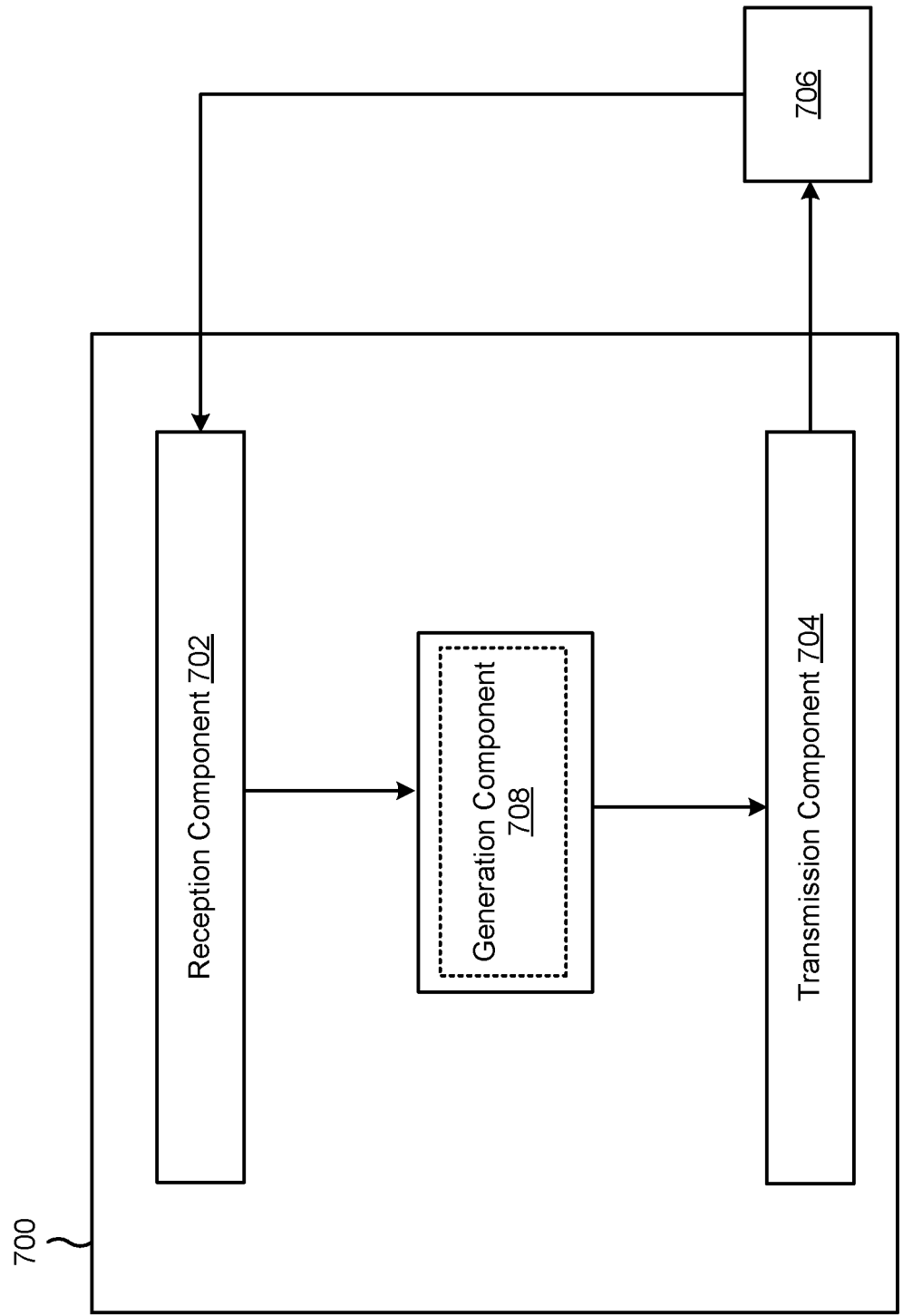
FIGS. 7-8 are block diagrams of example apparatuses for wireless communication, in accordance with the present disclosure.

FIG. 7 is a block diagram of an example apparatus 700 for wireless communication. The apparatus 700 may be a network node, or a network node may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a generation component 708, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the network node described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the network node described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the network node described above in connection with FIG. 2. In some aspects, the transmission component 704 may be collocated with the reception component 702 in a transceiver.

The generation component 708 may generate an intended TDD DL-UL configuration, wherein the network node is associated with a first CU and a second CU, and wherein the intended TDD DL-UL configuration is for a cell that is served by the network node and associated with the second CU. In some aspects, the generation component 708 may include one or more antennas, a demodulator, a MIMO detector, a receive processor, a modulator, a transmit MIMO processor, a transmit processor, a controller/processor, a memory, or a combination thereof, of the network node described above in connection with FIG. 2. The transmission component 704 may transmit the intended TDD DL-UL configuration for the cell to the first CU. The reception component 702 may receive, from the first CU, a request for the intended TDD DL-UL configuration, wherein transmitting the intended TDD DL-UL configuration is based at least in part on the request.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
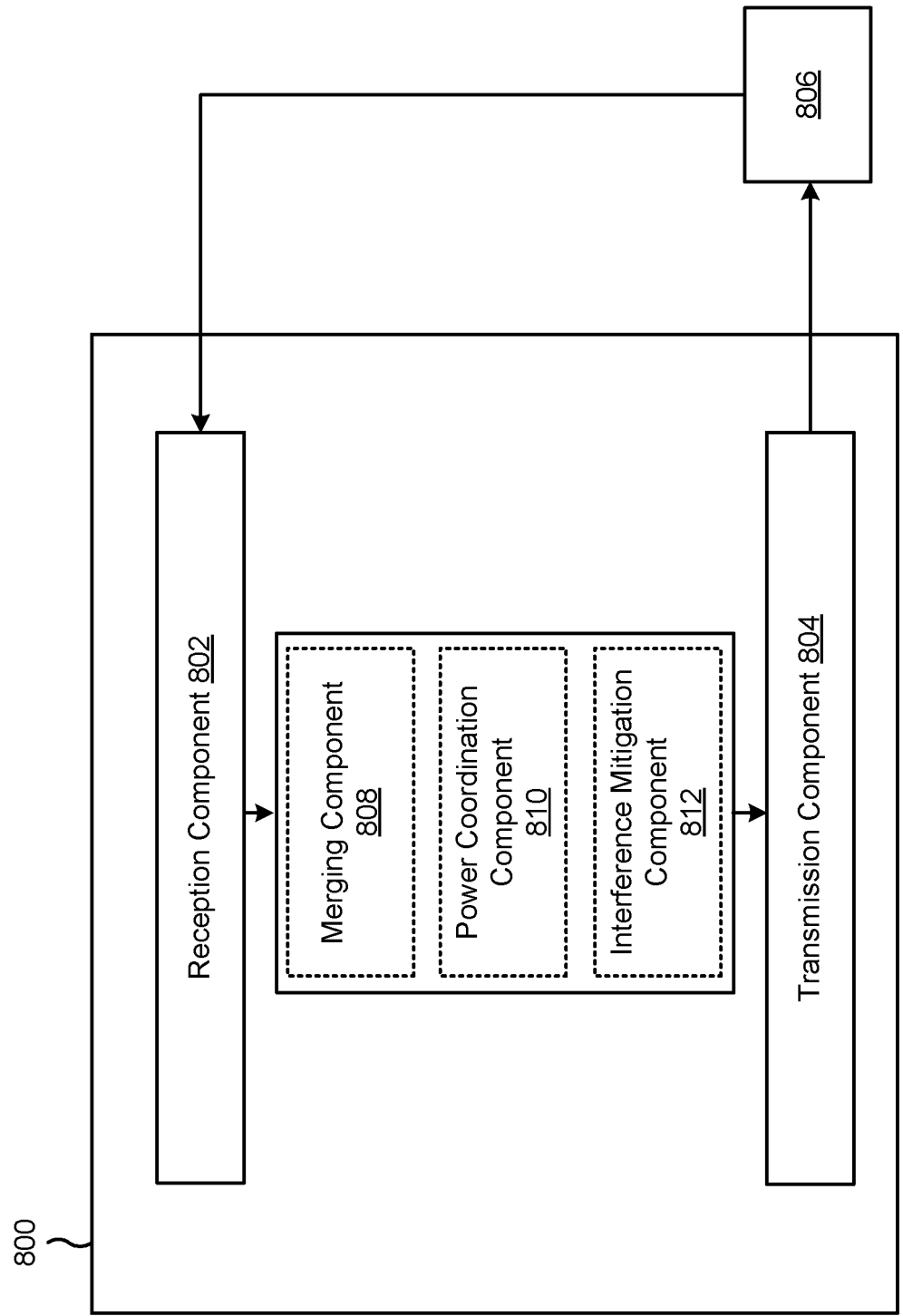

FIG. 8 is a block diagram of an example apparatus 800 for wireless communication. The apparatus 800 may be a CU, or a CU may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a merging component 808, a power coordination component 810, or an interference mitigation component 812, among other examples.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the CU described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS 110 described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS 110 described above in connection with FIG. 2. In some aspects, the transmission component 804 may be collocated with the reception component 802 in a transceiver.

The reception component 802 may receive, from a network node, an intended TDD DL-UL configuration, wherein the network node is associated with the first CU and a second CU, and wherein the intended TDD DL-UL configuration is for a cell that is served by the network node and associated with the second CU. The reception component 802 or the transmission component 804 may communicate based at least in part on the intended TDD DL-UL configuration for the cell.

The transmission component 804 may transmit, to the network node, a request for the intended TDD DL-UL configuration, wherein receiving the intended TDD DL-UL configuration is based at least in part on the request.

The merging component 808 may merge the first intended TDD DL-UL configuration and the second intended TDD DL-UL configuration. In some aspects, the merging component 808 may include one or more antennas, a demodulator, a MIMO detector, a receive processor, a modulator, a transmit MIMO processor, a transmit processor, a controller/processor, a memory, or a combination thereof, of the BS 110 described above in connection with FIG. 2.

The transmission component 804 may forward a merged intended TDD DL-UL configuration to a DU associated with the first CU. The transmission component 804 may transmit the intended TDD DL-UL configuration to a third CU or a gNB.

The power coordination component 810 may perform power coordination for dual connectivity based at least in part on the intended TDD DL-UL configuration. In some aspects, the power coordination component 810 may include one or more antennas, a demodulator, a MIMO detector, a receive processor, a modulator, a transmit MIMO processor, a transmit processor, a controller/processor, a memory, or a combination thereof, of the BS 110 described above in connection with FIG. 2.

The interference mitigation component 812 may perform cross-link interference mitigation based at least in part on the intended TDD DL-UL configuration. In some aspects, the interference mitigation component 812 may include one or more antennas, a demodulator, a MIMO detector, a receive processor, a modulator, a transmit MIMO processor, a transmit processor, a controller/processor, a memory, or a combination thereof, of the BS 110 described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a network node, comprising: generating an intended time division duplexing (TDD) downlink-uplink (DL-UL) configuration, wherein the network node is associated with a first central unit (CU) and a second CU, and wherein the intended TDD DL-UL configuration is for a cell that is served by the network node and associated with the second CU; and transmitting the intended TDD DL-UL configuration for the cell to the first CU.

Aspect 2: The method of any one of the previous Aspects, wherein the intended TDD DL-UL configuration is transmitted to the first CU on a signaling connection associated with an F1 control protocol.

Aspect 3: The method of any one of the previous Aspects, wherein the network node and the second CU are associated with a signaling connection associated with an F1 control protocol.

Aspect 4: The method of any one of the previous Aspects, wherein the network node comprises a first distributed unit (DU) associated with the first CU and a second DU associated with the second CU.

Aspect 5: The method of any one of the previous Aspects, wherein the first CU and the second CU are associated with a same network.

Aspect 6: The method of any one of the previous Aspects, wherein the first CU and the second CU are associated with different networks.

Aspect 7: The method of any one of the previous Aspects, wherein the cell is associated with a cell identifier that identifies the second CU.

Aspect 8: The method of any one of the previous Aspects, wherein the cell is associated with a cell identifier that identifies the first CU, and wherein the cell is deactivated by the first CU or is barred for access by child nodes that select a network associated with the first CU.

Aspect 9: The method of any one of the previous Aspects, wherein the intended TDD DL-UL configuration indicates a transmission periodicity for the cell.

Aspect 10: The method of any one of the previous Aspects, wherein the intended TDD DL-UL configuration indicates a set of slots with corresponding indices and slot formats for the set of slots.

Aspect 11: The method of any one of the previous Aspects, wherein the cell is a first cell, and wherein the network node serves a second cell.

Aspect 12: The method of Aspect 11, wherein the intended TDD DL-UL configuration is a first intended TDD DL-UL configuration, and wherein the method further comprises: transmitting, to the first CU, information indicating a second intended TDD DL-UL configuration for the second cell.

Aspect 13: The method of Aspect 11, wherein the intended TDD DL-UL configuration is for the first cell and the second cell.

Aspect 14: The method of Aspect 11, wherein the second cell is associated with the first CU.

Aspect 15: The method of Aspect 11, wherein the second cell is associated with the second CU.

Aspect 16: The method of Aspect 11, wherein the second cell is associated with a third CU.

Aspect 17: The method of any one of the previous Aspects, further comprising: receiving, from the first CU, a request for the intended TDD DL-UL configuration, wherein transmitting the intended TDD DL-UL configuration is based at least in part on the request.

Aspect 18: The method of Aspect 17, wherein the request is for a merged intended TDD DL-UL configuration for cells served by the network node and associated with the second CU.

Aspect 19: A method of wireless communication performed by a first central unit (CU), comprising: receiving, from a network node, an intended time division duplexing (TDD) downlink-uplink (DL-UL) configuration, wherein the network node is associated with the first CU and a second CU, and wherein the intended TDD DL-UL configuration is for a cell that is served by the network node and associated with the second CU; and communicating based at least in part on the intended TDD DL-UL configuration for the cell.

Aspect 20: The method of Aspect 19, wherein the intended TDD DL-UL configuration is received on a signaling connection associated with an F1 control protocol.

Aspect 21: The method of any one of Aspects 19-20, wherein the network node comprises a first distributed unit (DU) associated with the first CU and a second DU associated with the second CU.

Aspect 22: The method of any one of Aspects 19-21, wherein the first CU and the second CU are associated with a same network.

Aspect 23: The method of any one of Aspects 19-22, wherein the first CU and the second CU are associated with different networks.

Aspect 24: The method of any one of Aspects 19-23, wherein the cell is associated with a cell identifier that identifies the second CU.

Aspect 25: The method of any one of Aspects 19-24, wherein the cell is associated with a cell identifier that identifies the first CU, and wherein the cell is deactivated by the first CU or is barred for access by child nodes that select a network associated with the first CU.

Aspect 26: The method of any one of Aspects 19-25, wherein the intended TDD DL-UL configuration indicates a transmission periodicity for the cell.

Aspect 27: The method of any one of Aspects 19-26, wherein the intended TDD DL-UL configuration indicates a set of slots with corresponding indices and slot formats for the set of slots.

Aspect 28: The method of any one of Aspects 19-27, wherein the cell is a first cell, and wherein the network node serves a second cell.

Aspect 29: The method of Aspect 28, wherein the intended TDD DL-UL configuration is a first intended TDD DL-UL configuration, and wherein the method further comprises: receiving, from the network node, information indicating a second intended TDD DL-UL configuration for the second cell.

Aspect 30: The method of Aspect 28, wherein the intended TDD DL-UL configuration is for the first cell and the second cell.

Aspect 31: The method of Aspect 28, wherein the second cell is associated with the first CU.

Aspect 32: The method of Aspect 28, wherein the second cell is associated with the second CU.

Aspect 33: The method of Aspect 28, wherein the second cell is associated with a third CU.

Aspect 34: The method of any one of Aspects 19-33, further comprising: transmitting, to the network node, a request for the intended TDD DL-UL configuration, wherein receiving the intended TDD DL-UL configuration is based at least in part on the request.

Aspect 35: The method of Aspect 34, wherein the request is for a merged intended TDD DL-UL configuration for cells served by the network node and associated with the second CU.

Aspect 36: The method of any one of Aspects 19-35, wherein communicating based at least in part on the intended TDD DL-UL configuration further comprises: performing cross-link interference mitigation based at least in part on the intended TDD DL-UL configuration.

Aspect 37: The method of any one of Aspects 19-36, wherein communicating based at least in part on the intended TDD DL-UL configuration further comprises: performing power coordination for dual connectivity based at least in part on the intended TDD DL-UL configuration.

Aspect 38: The method of any one of Aspects 19-37, wherein the network node is a first distributed unit (DU), and wherein communicating based at least in part on the intended TDD DL-UL configuration further comprises: forwarding the intended TDD DL-UL configuration to a second DU associated with the first CU.

Aspect 39: The method of any one of Aspects 19-38, wherein the intended TDD DL-UL configuration is a first intended TDD DL-UL configuration, and wherein the method further comprises: receiving a second intended TDD DL-UL configuration.

Aspect 40: The method of Aspect 39, further comprising: merging the first intended TDD DL-UL configuration and the second intended TDD DL-UL configuration.

Aspect 41: The method of Aspect 40, further comprising: forwarding a merged intended TDD DL-UL configuration to a distributed unit (DU) associated with the first CU.

Aspect 42: The method of any one of Aspects 19-41, further comprising:
transmitting the intended TDD DL-UL configuration to a third CU or a gNB.

Aspect 43: A method of wireless communication performed by a network node, comprising: receiving an activation of a cell that is served by the network node, wherein the network node is associated with a first central unit (CU) and a second CU and the cell is associated with the second CU; and transmitting an intended time division duplexing (TDD) downlink-uplink (DL-UL) configuration for the cell to the first CU.

Aspect 44: The method of Aspect 43, wherein the intended TDD DL-UL configuration is transmitted to the first CU on a signaling connection associated with an F1 control protocol.

Aspect 45: The method of any of Aspects 43-44, wherein the network node and the second CU are associated with a signaling connection associated with an F1 control protocol.

Aspect 46: The method of any of Aspects 43-45, wherein the network node comprises a first distributed unit (DU) associated with the first CU and a second DU associated with the second CU.

Aspect 47: The method of any of Aspects 43-46, wherein the first CU and the second CU are associated with a same network.

Aspect 48: The method of any of Aspects 43-47, wherein the first CU and the second CU are associated with different networks.

Aspect 49: The method of any of Aspects 43-48, wherein the cell is associated with a cell identifier that identifies the second CU.

Aspect 50: The method of any of Aspects 43-49, wherein the cell is associated with a cell identifier that identifies the first CU, and wherein the cell is deactivated by the first CU or is barred for access by child nodes that select a network associated with the first CU.

Aspect 51: The method of any of aspects 43-50, wherein the intended TDD DL-UL configuration indicates a transmission periodicity for the cell.

Aspect 52: The method of any of aspects 43-51, wherein the intended TDD DL-UL configuration indicates a set of slots with corresponding indices and slot formats for the set of slots.

Aspect 53: The method of any of aspects 43-52, wherein the cell is a first cell, and wherein the network node serves a second cell, and wherein the intended TDD DL-UL configuration is for the first cell and the second cell.

Aspect 54: The method of Aspect 53, wherein the second cell is associated with one of: the first CU, the second CU, or a third CU.

Aspect 55: The method of any of aspects 43-54, further comprising: receiving, from the first CU, a request for the intended TDD DL-UL configuration, wherein transmitting the intended TDD DL-UL configuration is based at least in part on the request.

Aspect 56: The method of Aspect 55, wherein the request is for a merged intended TDD DL-UL configuration for cells served by the network node and associated with the second CU.

Aspect 57: A method of wireless communication performed by a first central unit (CU), comprising: receiving, from a network node, an intended time division duplexing (TDD) downlink-uplink (DL-UL) configuration, wherein the network node is associated with the first CU and a second CU, and wherein the intended TDD DL-UL configuration is for a cell that is served by the network node and associated with the second CU; and communicating based at least in part on the intended TDD DL-UL configuration for the cell.

Aspect 58: The method of Aspect 57, wherein the first CU and the second CU are associated with a same network.

Aspect 59: The method of any of Aspects 57-58, wherein the first CU and the second CU are associated with different networks.

Aspect 60: The method of any of Aspects 57-59, wherein the cell is associated with a cell identifier that identifies the second CU.

Aspect 61: The method of any of Aspects 57-60, wherein the cell is associated with a cell identifier that identifies the first CU, and wherein the cell is deactivated by the first CU or is barred for access by child nodes that select a network associated with the first CU.

Aspect 62: The method of any of Aspects 57-61, wherein the cell is a first cell, and wherein the network node serves a second cell, and wherein the intended TDD DL-UL configuration is for the first cell and the second cell.

Aspect 63: The method of Aspect 62, wherein the second cell is associated with one of: the first CU, the second CU, or a third CU.

Aspect 64: The method of any of Aspects 57-63, further comprising: transmitting, to the network node, a request for the intended TDD DL-UL configuration, wherein receiving the intended TDD DL-UL configuration is based at least in part on the request.

Aspect 65: The method of Aspect 64, wherein the request is for a merged intended TDD DL-UL configuration for cells served by the network node and associated with the second CU.

Aspect 66: The method of any of Aspects 57-65, wherein communicating based at least in part on the intended TDD DL-UL configuration further comprises: performing cross-link interference mitigation based at least in part on the intended TDD DL-UL configuration.

Aspect 67: The method of any of Aspects 57-66, wherein communicating based at least in part on the intended TDD DL-UL configuration further comprises: performing power coordination for dual connectivity based at least in part on the intended TDD DL-UL configuration.

Aspect 68: The method of any of Aspects 57-67, wherein the network node is a first distributed unit (DU), and wherein communicating based at least in part on the intended TDD DL-UL configuration further comprises: forwarding the intended TDD DL-UL configuration to a second DU associated with the first CU.

Aspect 69: The method of any of Aspects 57-68, wherein the intended TDD DL-UL configuration is a first intended TDD DL-UL configuration, and wherein the method further comprises: receiving a second intended TDD DL-UL configuration; merging the first intended TDD DL-UL configuration and the second intended TDD DL-UL configuration; and forwarding a merged intended TDD DL-UL configuration to a distributed unit (DU) associated with the first CU.

Aspect 70: The method of any of Aspects 57-69, further comprising: transmitting the intended TDD DL-UL configuration to a third CU or a gNB.

Aspect 71: An apparatus for wireless communication at a device, comprising a processor; memory coupled with the processor; and instructions stored in the memory and executable by the processor to cause the apparatus to perform the method of one or more of Aspects 1-70.

Aspect 72: A device for wireless communication, comprising a memory and one or more processors coupled to the memory, the one or more processors configured to perform the method of one or more of Aspects 1-70.

Aspect 73: An apparatus for wireless communication, comprising at least one means for performing the method of one or more of Aspects 1-70.

Aspect 74: A non-transitory computer-readable medium storing code for wireless communication, the code comprising instructions executable by a processor to perform the method of one or more of Aspects 1-70.

Aspect 75: A non-transitory computer-readable medium storing a set of instructions for wireless communication, the set of instructions comprising one or more instructions that, when executed by one or more processors of a device, cause the device to perform the method of one or more of Aspects 1-70.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
one or more memories; and
one or more processors coupled with the one or more memories, at least one of the one or more processors operable to cause the network node to:
receive an activation of a cell that is served by the network node, wherein the network node comprises signaling connections to a first central unit (CU) and a second CU, and wherein the cell is served by the second CU; and
transmit, to the first CU, an intended time division duplexing (TDD) downlink-uplink (DL-UL) configuration for the cell served by the second CU.

2. The network node of claim 1, wherein the intended TDD DL-UL configuration is transmitted to the first CU on a signaling connection associated with an F1 control protocol.

3. The network node of claim 1, wherein the network node and the second CU are associated with a signaling connection associated with an F1 control protocol.

4. The network node of claim 1, wherein the network node comprises a first distributed unit (DU) associated with the first CU and a second DU associated with the second CU.

5. The network node of claim 1, wherein the first CU and the second CU are associated with a same network.

6. The network node of claim 1, wherein the first CU and the second CU are associated with different networks.

7. The network node of claim 1, wherein the cell is associated with a cell identifier that identifies the second CU.

8. The network node of claim 1, wherein the cell is associated with a cell identifier that identifies the first CU, and wherein the cell is deactivated by the first CU or is barred for access by child nodes that select a network associated with the first CU.

9. The network node of claim 1, wherein the intended TDD DL-UL configuration indicates a transmission periodicity for the cell.

10. The network node of claim 1, wherein the intended TDD DL-UL configuration indicates a set of slots with corresponding indices and slot formats for the set of slots.

11. The network node of claim 1, wherein the cell is a first cell, and wherein the network node serves a second cell, and wherein the intended TDD DL-UL configuration is for the first cell and the second cell.

12. The network node of claim 11, wherein the second cell is associated with one of:
the first CU,
the second CU, or
a third CU.

13. The network node of claim 1, wherein the at least one of the one or more processors is further operable to cause the network node to:
receive, from the first CU, a request for the intended TDD DL-UL configuration, wherein transmitting the intended TDD DL-UL configuration is based at least in part on the request.

14. The network node of claim 13, wherein the request is for a merged intended TDD DL-UL configuration for cells served by the network node and associated with the second CU.

15. A first central unit (CU) for wireless communication, comprising:
one or more memories; and
one or more processors coupled with the one or more memories, at least one of the one or more processors operable to cause the first CU to:
receive, from a network node, an intended time division duplexing (TDD) downlink-uplink (DL-UL) configuration, wherein the network node comprises signaling connections to the first CU and a second CU, and wherein the intended TDD DL-UL configuration is for a cell that is served by the network node and the second CU; and
communicate based at least in part on the intended TDD DL-UL configuration for the cell.

16. The first CU of claim 15, wherein the first CU and the second CU are associated with a same network.

17. The first CU of claim 15, wherein the first CU and the second CU are associated with different networks.

18. The first CU of claim 15, wherein the cell is associated with a cell identifier that identifies the second CU.

19. The first CU of claim 15, wherein the cell is associated with a cell identifier that identifies the first CU, and wherein the cell is deactivated by the first CU or is barred for access by child nodes that select a network associated with the first CU.

20. The first CU of claim 15, wherein the cell is a first cell, and wherein the network node serves a second cell, and wherein the intended TDD DL-UL configuration is for the first cell and the second cell.

21. The first CU of claim 20, wherein the second cell is associated with one of:
the first CU,
the second CU, or
a third CU.

22. The first CU of claim 15, wherein the at least one of the one or more processors is further operable to cause the first CU to:
transmit, to the network node, a request for the intended TDD DL-UL configuration, wherein receiving the intended TDD DL-UL configuration is based at least in part on the request.

23. The first CU of claim 22, wherein the request is for a merged intended TDD DL-UL configuration for cells served by the network node and associated with the second CU.

24. The first CU of claim 15, wherein the at least one of the one or more processors, to communicate based at least in part on the intended TDD DL-UL configuration, is operable to cause the first CU to:
perform cross-link interference mitigation based at least in part on the intended TDD DL-UL configuration.

25. The first CU of claim 15, wherein the at least one of the one or more processors, to communicate based at least in part on the intended TDD DL-UL configuration, is operable to cause the first CU to:
perform power coordination for dual connectivity based at least in part on the intended TDD DL-UL configuration.

26. The first CU of claim 15, wherein the network node is a first distributed unit (DU), and wherein the at least one of the one or more processors, to communicate based at least in part on the intended TDD DL-UL configuration, is operable to cause the first CU to:
forward the intended TDD DL-UL configuration to a second DU associated with the first CU.

27. The first CU of claim 15, wherein the intended TDD DL-UL configuration is a first intended TDD DL-UL configuration, and wherein the at least one of the one or more processors is operable to cause the first CU to:
receive a second intended TDD DL-UL configuration;
merge the first intended TDD DL-UL configuration and the second intended TDD DL-UL configuration; and
forward a merged intended TDD DL-UL configuration to a distributed unit (DU) associated with the first CU.

28. The first CU of claim 15, wherein the at least one of the one or more processors is operable to cause the first CU to:
transmit the intended TDD DL-UL configuration to a third CU or a gNB.

29. A method of wireless communication performed by a network node, comprising:
receiving an activation of a cell that is served by the network node, wherein the network node comprises signaling connections to a first central unit (CU) and a second CU, and wherein the cell is served by the second CU; and transmitting, to the first CU, an intended time division duplexing (TDD) downlink-uplink (DL-UL) configuration for the cell served by the second CU.

30. A method of wireless communication performed by a first central unit (CU), comprising:
receiving, from a network node, an intended time division duplexing (TDD) downlink-uplink (DL-UL) configuration, wherein the network node comprises signaling connections to the first CU and a second CU, and wherein the intended TDD DL-UL configuration is for a cell that is served by the network node and the second CU; and
communicating based at least in part on the intended TDD DL-UL configuration for the cell.

* * * * *